(12) United States Patent
Uramichi et al.

(10) Patent No.: US 9,266,455 B2
(45) Date of Patent: Feb. 23, 2016

(54) CUSHION PAD FOR CAR SEAT

(71) Applicants: TOYOTA BOSHOKU KABUSHIKI KAISHA, Aichi-ken (JP); TOYOBO CO., LTD., Osaka (JP)

(72) Inventors: Hideki Uramichi, Aichi-ken (JP); Fumiya Makiguchi, Aichi-ken (JP); Masayuki Imagawa, Osaka (JP); Hirotaka Harada, Shiga (JP)

(73) Assignees: TOYOTA BOSHOKU KABUSHIKI KAISHA, Aichi-Ken (JP); TOYOBO CO., LTD., Osaka (JP)

( * ) Notice: Subject to any disclaimer, the term of this patent is extended or adjusted under 35 U.S.C. 154(b) by 5 days.

(21) Appl. No.: 13/771,327

(22) Filed: Feb. 20, 2013

(65) Prior Publication Data
US 2013/0214583 A1 Aug. 22, 2013

(30) Foreign Application Priority Data

Feb. 22, 2012 (JP) .................................. 2012-036333
Feb. 18, 2013 (JP) .................................. 2013-028650

(51) Int. Cl.
*A47C 7/02* (2006.01)
*B60N 2/70* (2006.01)
(Continued)

(52) U.S. Cl.
CPC ... *B60N 2/70* (2013.01); *A47C 5/12* (2013.01); *A47C 7/18* (2013.01); *A47C 7/185* (2013.01); *A47C 7/20* (2013.01); *A47C 31/006* (2013.01); *B60N 2/707* (2013.01); *B60N 2/7035* (2013.01); *B60N 2/7076* (2013.01); *A47C 27/122* (2013.01); *A47C 27/20* (2013.01); *A47C 27/22* (2013.01)

(58) Field of Classification Search
CPC ........ B60N 2/70; B60N 2/707; B60N 2/7076; B60N 2/7035; A47C 7/20; A47C 7/02; A47C 7/185; A47C 7/18; A47C 5/00; A47C 5/12; A47C 31/006; A47C 27/122; A47C 27/22; A47C 27/20; F16F 1/424
USPC ............. 297/452.27, 452.53, 452.57, 452.21, 297/452.22, 452.23, 452.55, 452.56, 297/452.51, 452.52, 452.37
See application file for complete search history.

(56) References Cited

U.S. PATENT DOCUMENTS 2,797,741 A * 7/1957 Hodges, Jr. .......... B60N 2/7035
267/102
2,800,165 A * 7/1957 Talalay et al. ................. 267/145
(Continued)

FOREIGN PATENT DOCUMENTS

GB 2144071 A * 2/1985 ............. B29D 27/04
JP 06-133834 5/1994
(Continued)

*Primary Examiner* — David E Allred
(74) *Attorney, Agent, or Firm* — Greenblum & Bernstein, P.L.C.

(57) ABSTRACT

Embodiments of present invention may include a cushion pad for supporting a seated passenger; the cushion pad being divided into a left pad section, a middle pad section and a right pad section; a soft resin foam dispersed throughout the left pad section, the middle pad section and the right pad section; the left pad section having a left holding volume for holding a first volume of an elastic three-dimensional fibrous network and the soft resin foam; the right pad section having a right holding volume for holding a second volume of an elastic three-dimensional fibrous network and the soft resin foam; and the middle pad section not having a volume of an elastic three-dimensional fibrous network contained within.

18 Claims, 6 Drawing Sheets

(51) Int. Cl.
*A47C 5/12* (2006.01)
*A47C 31/00* (2006.01)
*A47C 7/18* (2006.01)
*A47C 7/20* (2006.01)
A47C 27/12 (2006.01)
A47C 27/22 (2006.01)
A47C 27/20 (2006.01)

(56) References Cited

U.S. PATENT DOCUMENTS

| | | | |
|---|---|---|---|
| 3,675,970 A * | 7/1972 | Bereday | 297/452.55 |
| 3,691,569 A * | 9/1972 | Ikada | 5/655.9 |
| 3,833,454 A * | 9/1974 | Ambrose | 297/452.57 |
| 4,492,408 A * | 1/1985 | Lohr | 297/344.1 |
| 4,577,907 A * | 3/1986 | Talmon et al. | 297/452.12 |
| 4,592,589 A * | 6/1986 | Hellwig | 297/452.41 |
| 4,682,818 A * | 7/1987 | Morell | 297/452.27 |
| 4,699,427 A * | 10/1987 | Kobayashi | 297/452.62 |
| 4,753,480 A * | 6/1988 | Morell | 297/452.27 |
| 4,819,288 A * | 4/1989 | Lowthian | 5/653 |
| 5,085,487 A * | 2/1992 | Weingartner et al. | 297/452.1 |
| 5,123,699 A * | 6/1992 | Warburton | 297/219.1 |
| 5,269,590 A * | 12/1993 | Carilli | 297/452.55 |
| 5,283,918 A * | 2/1994 | Weingartner et al. | 297/452.21 |
| 5,352,023 A * | 10/1994 | Jay et al. | 297/452.21 |
| 5,442,823 A * | 8/1995 | Siekman et al. | 5/653 |
| 5,544,942 A * | 8/1996 | Vu Khac et al. | 297/452.37 |
| 5,609,395 A * | 3/1997 | Burch | 297/452.55 |
| 6,125,486 A * | 10/2000 | Rabon | 5/654 |
| 6,199,252 B1 * | 3/2001 | Masters et al. | 29/91.1 |
| 6,231,125 B1 * | 5/2001 | Maeda et al. | 297/452.56 |
| 6,425,153 B1 * | 7/2002 | Reswick | 5/655.9 |
| 6,625,830 B2 * | 9/2003 | Lampel | 5/653 |
| 6,755,475 B1 * | 6/2004 | Tiesler et al. | 297/452.26 |
| 7,891,033 B2 * | 2/2011 | Loewenthal et al. | 5/653 |
| 8,020,937 B2 * | 9/2011 | Partington et al. | 297/452.48 |
| 9,004,605 B2 * | 4/2015 | Nishiyama | B60N 2/44 297/452.27 |
| 2006/0170274 A1* | 8/2006 | Moule | 297/452.25 |
| 2007/0001506 A1* | 1/2007 | Stowe | 297/452.42 |
| 2007/0135878 A1* | 6/2007 | Lachenbruch et al. | 607/108 |
| 2009/0313764 A1* | 12/2009 | Deporte | 5/716 |
| 2010/0306894 A1* | 12/2010 | Calvert | 2/16 |
| 2014/0053341 A1* | 2/2014 | Parvin | 5/740 |

FOREIGN PATENT DOCUMENTS

| | | | | |
|---|---|---|---|---|
| WO | WO 9412080 A1 * | 6/1994 | | A47C 7/02 |
| WO | WO 9500052 A1 * | 1/1995 | | A47C 7/14 |

* cited by examiner

CUSHION PAD FOR CAR SEAT

This application claims priority to Japanese patent applications serial number 2012-036333 and 2013-028650, the contents of which are incorporated herein by reference.

BACKGROUND OF THE INVENTION

Field of the Invention

The present invention relates to cushion pads for car seats.

In a car seat that a passenger uses in a car, a seat cushion having cushion pads made of urethane foam is conventionally used (see Japanese Laid-open Patent Application Publication No. 06-133834). In common cushion pads, a portion to support the buttocks have a thickness of about 100 mm so that it can provide seating comfort and other functions.

Some hybrid electric vehicles have one of its driving sources, a battery pack, mounted under the seat cushion. As such, it is necessary to reduce the overall height of the seat assembly to secure a space for mounting the battery pack. Therefore, there is a need for a thinner cushion pad which constitute a part of the assembly. However, simply reducing the pad thickness from 100 mm to a thinner 50 mm would degrade various functions expected for cushion pads and sacrifice comfort of occupants. There is thus a need in the art for thinner but comfortable cushion pads.

SUMMARY OF THE INVENTION

According to one aspect of the present invention there is provided a cushion pad for a car seat where an occupant is seated, comprising: a cushion pad for supporting a seated passenger; the cushion pad being divided into a left pad section, a middle pad section and a right pad section; a soft resin foam dispersed throughout the left pad section, the middle pad section and the right pad section; the left pad section having a left holding volume for holding a first volume of an elastic three-dimensional network; and the right pad section having a right holding volume for holding a second volume of an elastic three-dimensional network. This allows for the cushion pad to firmly support the seated person by the elastic three-dimensional network in spite of thinness of the cushion pad, and to provide a comfort without a sense of hardness to it.

DETAILED DESCRIPTION OF THE INVENTION

Each of the additional features and teachings disclosed above and below may be utilized separately or in conjunction with other features and teachings to provide improved car seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

First Embodiment

Figure 1:
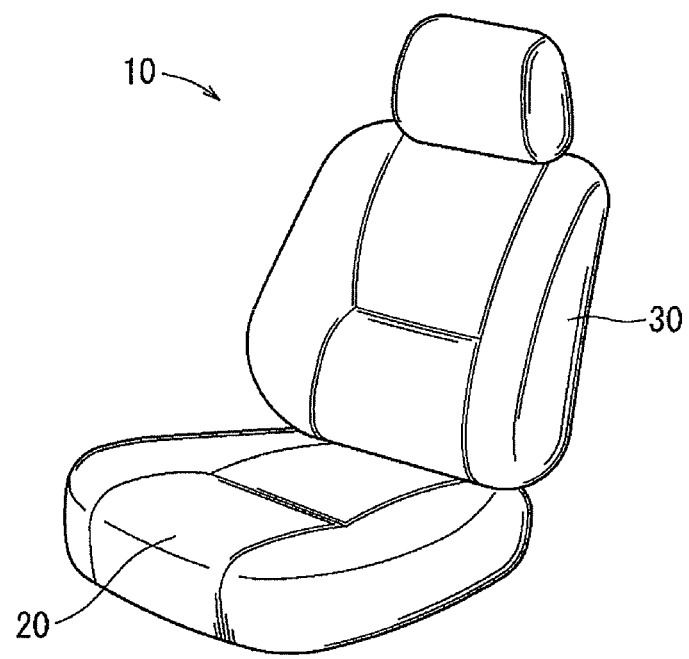
FIG. 1 is a perspective view of a car seat according to some embodiments.

FIG. 1 shows a car seat 10 where a passenger to be seated. The seat 10 has a seat cushion 20 on which a passenger sits and a seat back 30 against which that person leans. The seat back 30 is coupled to a rear portion of the seat cushion 20. The seat cushion 20 has a frame inside (not shown). A metal plate cushion pan 50 (see FIG. 3) is bridged across the frame to support sitting weight. The top of the cushion pan 50 is provided with a cushion pad 60 which provides a seating surface. The cushion pad 60 is covered with a covering material 40 to provide feel and a design.

The cushion pad 60 is generally formed of soft polyurethane foam. Having a moderate cushioning property, the cushion pad 60 supports a seated passenger while deflecting weight of that person. Polyurethane foam is typically a copolymer of polyols and isocyanates. It is typically generated by adding appropriate catalyst, foaming agent and foam stabilizer to polyol and isocyanate monomers and heating them to react. Specific compositions for the polyurethane foam for cushion pads is well known and will not be described here in detail.

Figure 2:
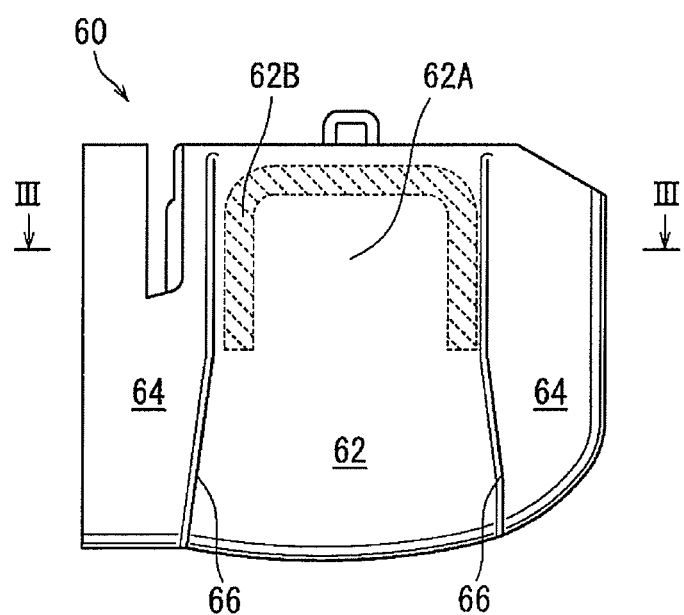
FIG. 2 is a plan view of a cushion pad according to a first embodiment.
Figure 3:
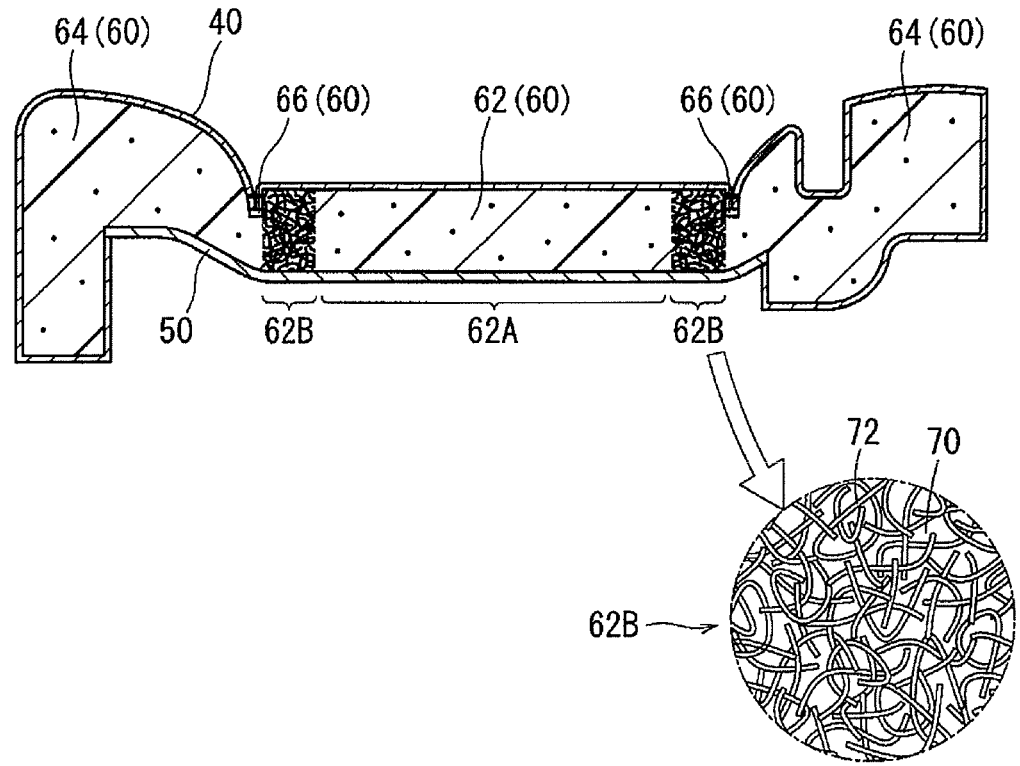
FIG. 3 is a cross-sectional view of the cushion pad of FIG. 2 sectioned along the line III-III.

As shown in FIG. 2, the cushion pad 60 is divided in width into a level part 62 in the middle and side support parts 64 in the left and right sides, bordered by two grooves extending in the longitudinal direction of the sheet. The level part 62 receives the buttocks of a seated passenger on its top seating surface, and supports downward sitting weight. The level part 62 may have a width of about 300-400 mm and a height of about 50 mm. The side support parts 64 are both formed like a bank rising upward from the top surface of the level part 62 as shown in FIG. 3, to support weight in the width direction when the car turns to maintain a stable posture of the seated person. The groove 66 is a downward recess from the top seating surface. A portion of the covering material located just above the groove 66 is drawn into the groove 66 and suspended by retainers fixed in the groove 66. Covering material 40 covers the surface of the level part 62 and the side support parts 64 with tension.

In the ordinary position of the seated person, sitting weight from buttocks H acts downward onto a certain area (hereafter referred to as "active area") near the rear in the level part 62. In particular, the central portion 62A of the active area (see FIG. 2) includes a portion for receiving the tuberosity of the ischium T, a pair of sitting bones, which projects the lowermost of buttock bones. A portion formed of an elastic material having a higher elastic modulus (elastic portion 62B) than the resin foam of the central portion 62A is provided along the periphery of the active area. It is provided so as to avoid the site which receives the tuberosity T.

The elastic portions 62B are placed at least at a position facing each other on both sides across the central portion 62A. In the present embodiment, the elastic portions 62B are preferably C-shaped or horseshoe-shaped with their opening facing towards the front with left and right side portions facing each other across the central portion 62A, as shown in FIG. 2. As shown in cross-sectional view of FIG. 3, the elastic portion 62B spans throughout the entire height from the lower surface up to the upper surface (seating surface) of the cushion pad. The outer sides (far from the 62A central region) and inner sides (near the central portion 62A) of the elastic portions 62B are generally vertical. The width of the elastic portion 62B between the outer to the inner side may preferably be 30 mm or more. The spacing between the inner side of the portion opposing the elastic portion 62B may preferably be at least 200 mm. The cross section of the elastic portions 62B may be of any shape such as to fit the buttock contour when the central portion 62A is deflected downward under sitting weight. The cross-section may preferably have a linear side at the bottom on a flat surface of a support, and the other sides configured to fit the buttock, to form, for example, a rectangular, triangular or semicircular shape.

Figure 4:
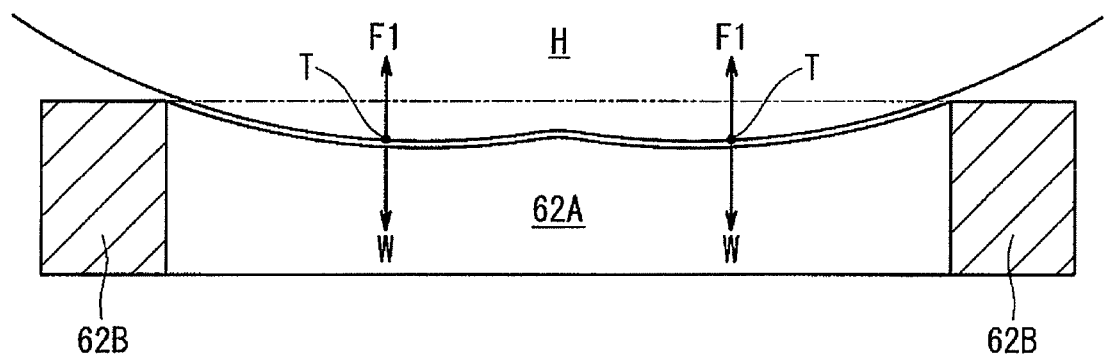
FIG. 4 is a schematic cross-sectional view illustrating how the cushion pad works on a stage of low sitting weight.
Figure 5:
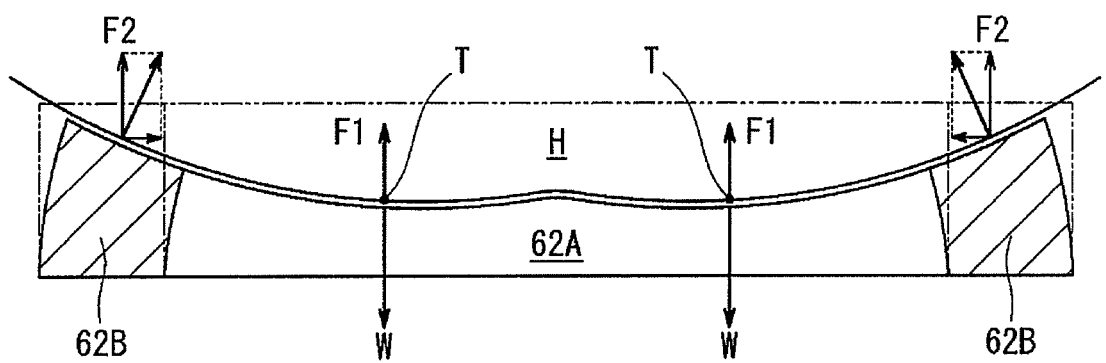
FIG. 5 is a schematic cross-sectional view illustrating how the cushion pad works when the sitting weight reaches a high weight stage.

In the following will be described how the central portion 62A and the elastic portion 62B works when a person sits on the cushion pad 60. FIGS. 4 and 5 are cross-sectional views of the level part 62 of the cushion pad 60. They are sectioned in the plane containing the elastic portions 62B that oppose the central portion 62A. FIG. 4 illustrates a stage in which the sitting weight W is still within a lower weight range and deflection is thus relatively small. FIG. 5 shows a stage in which sufficient time has elapsed after the sitting weight W has reached a high weight range, and the occupant's posture is stable and the sitting weight W is substantially supported. When a person is going to sit on the cushion pad, as shown in FIGS. 4 and 5, a sitting weight W acts on the level part 62 of the cushion pad, and the level part 62 starts to deform downward. As shown in FIG. 4, in the initial stage of sitting, only the central portion 62A of the active area (made of resin foam) is depressed downward in accordance with the contour of the buttocks. This downward depression includes the tuberosity of the ischium T. It is thus possible in the initial sitting stage to softly receive the tuberosity T by the soft foam. The sitting weight W is supported by the upward reaction force F1 due to this deformation. As shown in FIG. 5, the elastic portions 62B in both sides also starts to be deformed downward. At this time, the elastic deformation of the upper part of the body portions 62B are resiliently deformed downward. They are also drawn in the direction approaching each other following downward deflection of the central portion 62A. Thus, at least the top of the elastic member 62B is able to deform in cooperation with the central portion 62A. In the present embodiment, the elastic portion 62B and the central portion 62A are bonded together on their interface.

Figure 11:
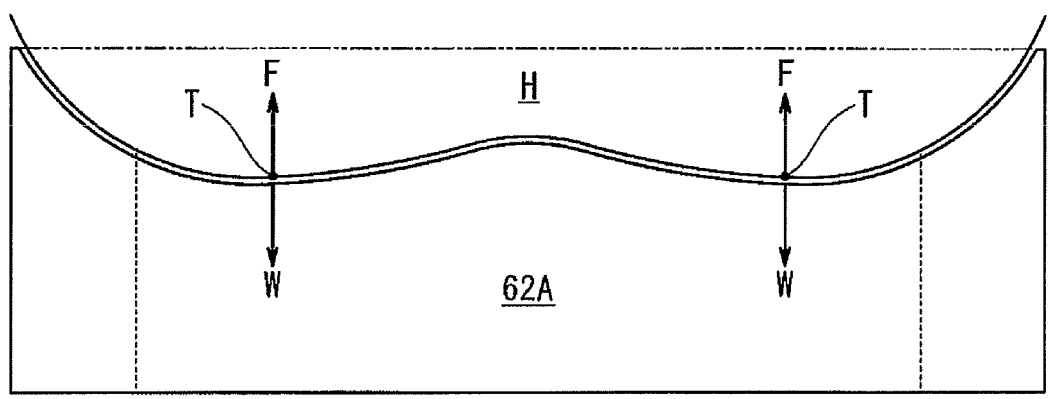
FIG. 11 is a schematic cross-sectional view illustrating the operation of the step of sitting weight reaching a high weight in the conventional cushion pad 11.

As shown in FIG. 11, a conventional thick cushion pad is not provided with any portion having relatively high elastic modulus as in the present embodiment. Therefore, the side portion outside the two-dot chain line in FIG. 11, which corresponds to the elastic portion 62B of this embodiment, could be deformed more freely according to the contour of the buttocks to produce only an upward reaction force of F. Further, since the contour of the buttocks is not flat but inclined upward as it extends toward the periphery, the amount of deflection of the peripheral portion would be smaller than that of the central portion 62A. The peripheral portion thus would have little contribution to supporting the sitting weight W in spite of a thickness of the level part 62. In the present embodiment, however, the elastic portion 62B, having a higher elastic modulus than that of the central portion 62A, can exhibit a larger reaction force when the sitting weight W reaches more than a certain degree as shown in FIG. 5. Due to its high elastic modulus, the elastic portion 62B is not allowed to free deform as compared to the central portion 62A. This provides for downwardly depressed as well as inwardly curved deformation behavior. The upper portion of the elastic portions 62B of each side are thus drawn closer to each other, following the downward bending of the central portion 62A. As the central portion 62A is more depressed, the role in bearing the sitting weight W gradually transits to the elastic portion 62B. The elastic portion 62B exhibits its support function in accordance with the amount of deformation of 62A the central portion. Since the top surface of the elastic portion 62B is inclined from the round configuration of the buttocks, the reaction force acts against the sitting weight W in an inwardly diagonal direction as shown in FIG. 5. Thus, this upward vertical force component F2 of the diagonal force is added as a new force to the upward vertical reaction force F1 of the central portion 62A to contribute to supporting sitting weight W.

Now, an elastic body which constitutes the elastic portion 62B will be described in detail. In the present embodiment, the elastic body occupying the elastic portion 62B is a composite in which resin foam 70 is filled in the pores of the three-dimensional network 72, as shown in partial enlarged view in FIG. 3. In other words, the three-dimensional network 72 is impregnated with the resin foam. Such an embodiment can be viewed in FIG. 3. This three-dimensional network has, in particular, a three-dimensional network structure forming a number of pores in communication with each other. The three-dimensional network 72 is preferably a fibrous network of objects and/or materials. Such a fibrous network may be arranged in an organized or disorganized manner. The network is also preferably an elastic one which exhibits elasticity through deformation of the network structure. Furthermore, by foam resin 70 thus filled in the pores of the network structure of the elastic three-dimensional network 72, the elastic modulus of the resin foam is added to that of network structure. The elastic modulus of the resin foam 70 and the three-dimensional network 72 is determined so that the increased elastic modulus of the elastic portion 62B is higher than that of the foam of the central portion 62A. The elastic body, having a composite structure, can be produced by foaming the raw materials so as to disperse them through pores in the three-dimensional network 72. In particular, the three-dimensional network 72 is fixed at a certain position in the mold for the cushion pad 60. The elastic portion 62B is formed by a part of the raw materials dispersed into the network while foaming occurs at the same time. The surrounding resin foam portions may be formed in this way. The three-dimensional network 72 structure is preferably largely unaffected by the heat generated during the foaming reaction of the raw materials. At least a part of the surface of the three-dimensional network may preferably have pores for raw resin material to enter the network. The elastic portion 62B and the central portion 62A can be bonded together on their interface.

A fibrous structure of thermoplastic resin filaments may be used as an example of the elastic three-dimensional network 72. More specifically, in the fibrous structure, thermoplastic resin filaments are randomly, three-dimensionally entangled forming a number of loops, with a contact portion of the filaments bonded together by heat. Such thermoplastic material may be common materials such as polyester, polyamide, polyether and polyolefin thermoplastic. Filaments of thermoplastic resin can be produced by extrusion, and changed in cross-sectional configuration, size, shape, and solidness or hollowness. Randomized loops formed by these filaments constitute a three-dimensional isotropic spring. Each loop deflects to exhibit overall elasticity of the structure. It is possible to adjust the elastic modulus (hardness) by changing the apparent density of the three-dimensionally extending filaments. This can be done as an alternate to or in addition to changing forms of the cross-section of the filaments described above. The fibrous material can be cut, hot-pressed or glued to form any desired configuration. Edges of the fibrous material may be beveled or rounded. For example, Breathair™, manufactured by Toyobo Co., Ltd. may be suitably used as a fibrous structure. Breathair is characterized by low hysteresis loss and high resilience. For this reason, the cushion pad 60 using Breathair has less change over time under repeated compression, and therefore good durability.

A cushion pad according to the present embodiment achieves the following advantageous effects. A seated person can be supported firmly by the elastic portion 62B with elastic three-dimensional network even if the cushion pad 60 may be thin. Furthermore, the cushion pad can provide a comfortable seating without feeling hard sense due to the central portion 62A made of soft resin foam. Further, the cross section of the elastic portions 62B may preferably have a linear side at the bottom, and the other sides configured in any form to fit the buttock contour in order to provide a firmer support. In addition, the elastic portion 62B, preferably has a longer height than width. In this way, the elastic portions 62B can be easily bent inwardly following the downwardly deflecting central portion 62A. Further, the seated person can be firmly supported by the elastic portion 62B, which spans throughout from the upper to the lower surface of the cushion pad 60.

Other Embodiments

Figure 6:
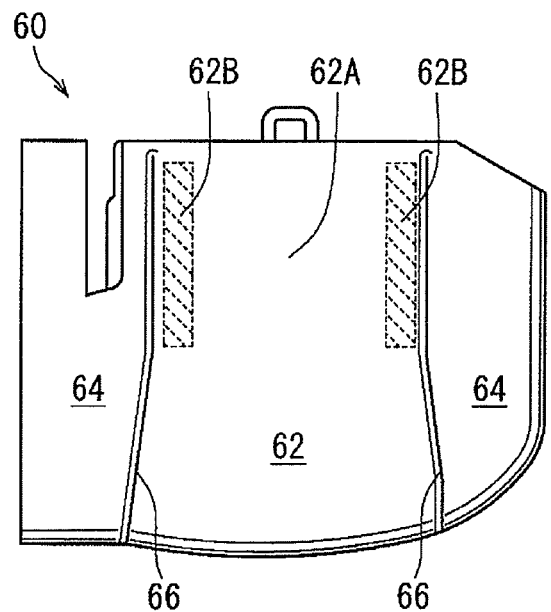
FIG. 6 is a plan view of a cushion pad according to a second embodiment.
Figure 7:
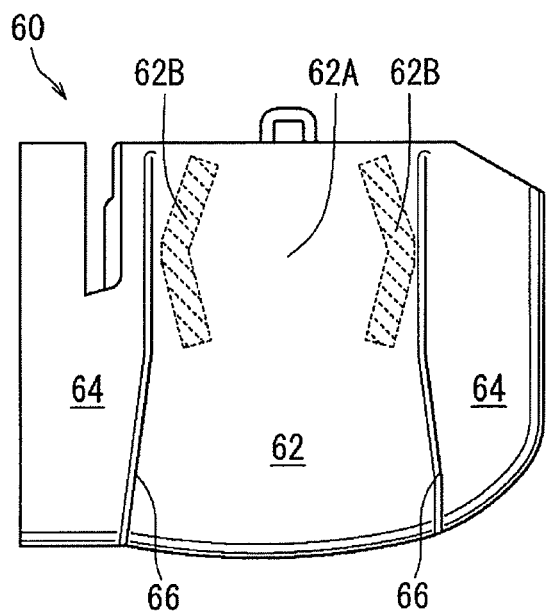
FIG. 7 is a plan view of a cushion pad according to a third embodiment.
Figure 8:
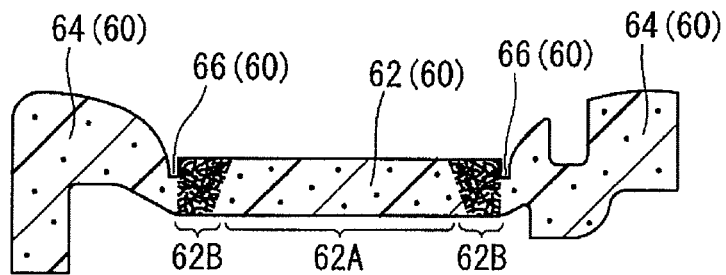
FIG. 8 is a cross-sectional view of a cushion pad according to a fourth embodiment.
Figure 9:
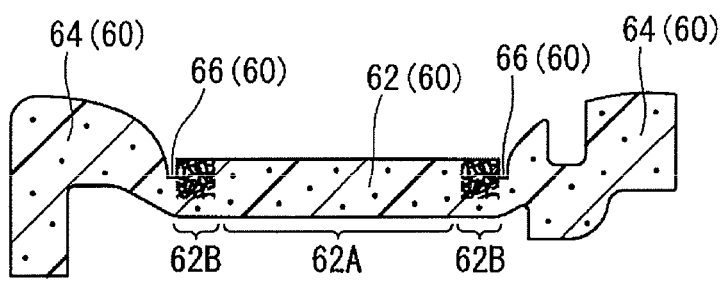
FIG. 9 is a cross-sectional view of a cushion pad according to a fifth embodiment.
Figure 10:
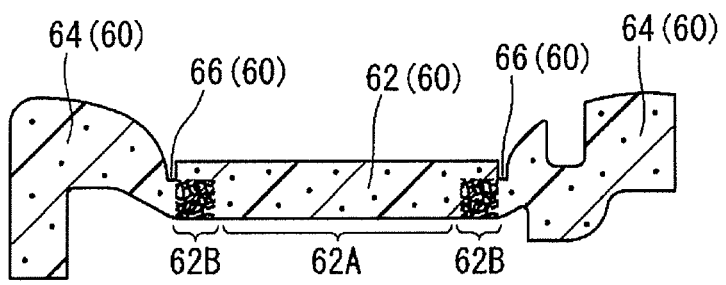
FIG. 10 is a cross-sectional view of a cushion pad according to a sixth embodiment.

Other embodiments of the present invention will be described further. The top view arrangement of the elastic portion 62B may be altered compared to the first embodiment. In a second embodiment shown in FIG. 6, the elastic portions 62B are placed in the left and right sides of the central portion 62A, and configured in a straight bar shape aligned in the depth direction. In a third embodiment shown in FIG. 7, the elastic portion 62B is placed in the left and right sides of the central portion 62A and is configured in an outwardly bent bar, resembling a pair of brackets. In either of the second and the third embodiment, there may be provided no elastic portion at the rear part of the active area. However, the elastic portions 62B are preferably placed at the left and right sides facing each other across the central portion 62A, as in the first embodiment. Alternatively, the elastic portion may be placed at both the front and the rear position facing across the central portion 62A. As long as they are placed at positions facing across the central portion 62A, is not necessary to configure the elastic portions 62B in a bar shape or the like. For example, the elastic portion 62B may be of a shorter shape, such as cylindrical or prismatic. The cross-sectional shape of the elastic portion 62B may be modified compared to the first embodiment. In a fourth embodiment shown in FIG. 8, the inner side of the elastic portion 62B is inclined outward at the bottom. In a fifth embodiment shown in FIG. 9, the elastic portion 62B is disposed only at the top of the cushion pad 60. In a sixth embodiment shown in FIG. 10, the elastic portion 62B is disposed only at the bottom of the cushion pad 60.

In the embodiments described above, the elastic material constituting the elastic portion 62B may be one with resin foam 70 filled in the gaps of the coil spring instead of the elastic three-dimensional network 72 described above. It is preferable that the material, as a whole, has a higher elastic modulus compared to that of the central portion 62A alone. The elastic material may be simply a volume of rubber or polyurethane foam instead of a composite structure. The central portion 62A and the elastic portion 62B may be bonded by glue, through connection with each other or another member, or connected by suitable chemical bonds. However, bonds of the central portion 62A and the elastic portion 62B are not always necessary. The top of the elastic portion 62B may be dragged horizontally by the covering material 40 due to its tension to deform following the central portion 62A. The three-dimensional network 72 may be, for example, an open-celled resin foam, instead of a fibrous structure of thermoplastic resin filaments described above.

This invention claims:

1. A cushion pad for a car seat where an occupant is seated, comprising:
    a cushion pad for supporting a seated passenger;
    the cushion pad being divided into a left pad section, a middle pad section and a right pad section;
    a soft resin foam dispersed throughout the left pad section, the middle pad section and the right pad section;
    the left pad section having a left holding volume for holding a first volume of an elastic three-dimensional fibrous network and the soft resin foam;
    the right pad section having a right holding volume for holding a second volume of an elastic three-dimensional fibrous network and the soft resin foam; and
    the middle pad section not having a volume of an elastic three-dimensional fibrous network contained within,
    wherein an uppermost surface of each of the left pad section, the middle pad section and the right pad section lies within a common plane, and
    in each of the left pad section and the right pad section, an upper width of the elastic three-dimensional fibrous network at the uppermost surface is wider than a lower width of the elastic three-dimensional fibrous network at a lowermost surface, the upper width and the lower width extending from side surfaces of the cushion pad toward the middle pad section.

2. The cushion pad of claim 1, wherein:
    a cross-section of the left holding volume has at least one linear side; and
    a cross-section of the right holding volume has at least one linear side.

3. The cushion pad of claim 1, wherein:
    the first volume of elastic three-dimensional fibrous network spans from the uppermost surface to the lowermost surface of the left pad section; and
    the second volume of elastic three-dimensional fibrous network spans from the uppermost surface to the lowermost surface of the right pad section.

4. The cushion pad of claim 1,
wherein at least one of the first volume of the elastic three-dimensional fibrous network or the second volume of the elastic three-dimensional fibrous network includes a plurality of filament loops wherein contact portions between the plurality of filament loops are bonded together.

5. The cushion pad of claim 4,
wherein the plurality of filament loops is comprised of at least one polyester, polyamide, polyether or polyolefin thermoplastic.

6. The cushion pad of claim 1, wherein the uppermost surface of the left pad section, the middle pad section and the right pad section comprise a continuous surface.

7. The cushion pad of claim 1, wherein each of the left pad section, the middle pad section and the right pad section have a same thickness.

8. The cushion pad of claim 7, wherein the same thickness of each of the left pad section, the middle pad section and the right pad section is uniform between side surfaces of each of the left pad section, the middle pad section and the right pad section.

9. The cushion pad of claim 1, wherein, in each of the left pad section and the right pad section, the elastic three-dimensional fibrous network is configured in a straight bar shape aligned in a depth direction of the left pad section and the right pad section.

10. The cushion pad of claim 1, wherein, in each of the left pad section and the right pad section, the elastic three-dimensional fibrous network is configured in an outwardly bent bar shape aligned in a depth direction of the left pad section and the right pad section, the outwardly bent bar shape having a middle portion disposed further from the middle pad section than end portions of the outwardly bent bar shape.

11. The cushion pad of claim 1, wherein, in each of the left pad section and the right pad section, the elastic three-dimensional fibrous network is disposed in an upper portion adjacent the uppermost surface and not disposed in a lower portion adjacent the lowermost surface.

12. A cushion for a vehicle comprising:
a cushion having a main pad section and two lateral support sections; and
the main pad section being divided into a left pad section, a middle pad section and a right pad section;
wherein the two lateral support sections contain soft resin,
the main pad section contains a combination of soft resin and a volume of elastic, fibrous material,
an uppermost surface of each of the left pad section, the middle pad section and the right pad section lies within a common plane,
the volume of elastic, fibrous material of the main pad section is confined to the left pad section and the right pad section, and
in each of the left pad section and the right pad section, an upper width of the elastic three-dimensional fibrous network at the uppermost surface is wider than a lower width of the elastic three-dimensional fibrous network at a lowermost surface, the upper width and the lower width extending from side surfaces of the cushion pad toward the middle pad section.

13. The cushion for the vehicle of claim 12, wherein a spacing between an inner side of the left pad section and an inner side of the right pad section is at least 200 mm.

14. The volume of elastic, fibrous material used in the cushion for the vehicle of claim 12, wherein the volume of the elastic, fibrous material includes a plurality of filament loops wherein contact portions between the plurality of filament loops are bonded together.

15. The volume of elastic, fibrous material of claim 14, wherein the plurality of filament loops is comprised of at least one polyester, polyamide, polyether or polyolefin thermoplastic.

16. The cushion for the vehicle of claim 12, wherein the uppermost surface of the left pad section, the middle pad section and the right pad section comprise a continuous surface.

17. The cushion for the vehicle of claim 12, wherein each of the left pad section, the middle pad section and the right pad section have a same thickness.

18. A cushion pad for a car seat where an occupant is seated, comprising:
a cushion pad for supporting a seated passenger;
the cushion pad being divided into a left pad section, a middle pad section and a right pad section;
a soft resin foam dispersed throughout the left pad section, the middle pad section and the right pad section;
the left pad section having a left holding volume for holding a first volume of an elastic three-dimensional fibrous network and the soft resin foam;
the right pad section having a right holding volume for holding a second volume of an elastic three-dimensional fibrous network and the soft resin foam; and
the middle pad section not having a volume of an elastic three-dimensional fibrous network contained within,
wherein an uppermost surface of each of the left pad section, the middle pad section and the right pad section lies within a common plane,
in each of the left pad section and the right pad section, the elastic three-dimensional fibrous network is disposed non-uniformly from the uppermost surface to a lowermost surface, and
in each of the left pad section and the right pad section, an upper width of the elastic three-dimensional fibrous network at the uppermost surface is wider than a lower width of the elastic three-dimensional fibrous network at a lowermost surface, the upper width and the lower width extending from side surfaces of the cushion pad toward the middle pad section.

* * * * *